(12) United States Patent
Hsieh

(10) Patent No.: US 7,868,574 B2
(45) Date of Patent: Jan. 11, 2011

(54) MOTOR ABSOLUTE POSITION SIGNAL PROCESSING APPARATUS

(75) Inventor: Wen-Cheng Hsieh, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 407 days.

(21) Appl. No.: 12/014,157

(22) Filed: Jan. 15, 2008

(65) Prior Publication Data

US 2009/0179607 A1 Jul. 16, 2009

(51) Int. Cl.
*G05B 19/00* (2006.01)
*G05B 11/01* (2006.01)

(52) U.S. Cl. ............... 318/560; 318/569; 340/855.3

(58) Field of Classification Search ........... 318/560, 318/569, 592, 595, 602, 625, 661, 685, 696; 340/855.3, 870.12, 870.13; 250/231.18
See application file for complete search history.

(56) References Cited

U.S. PATENT DOCUMENTS

| | | | | | |
|---|---|---|---|---|---|
| 4,429,267 | A | * | 1/1984 | Veale | 318/594 |
| 4,439,755 | A | * | 3/1984 | LaRussa | 340/980 |
| 4,751,441 | A | * | 6/1988 | Lewis | 318/400.09 |
| 4,812,722 | A | * | 3/1989 | Corrothers | 318/561 |
| 5,121,327 | A | * | 6/1992 | Salazar | 705/408 |
| 5,530,331 | A | * | 6/1996 | Hanei | 318/592 |
| 5,668,456 | A | * | 9/1997 | Nakata et al. | 318/602 |
| 5,684,373 | A | * | 11/1997 | Nakata et al. | 318/602 |
| 5,815,089 | A | * | 9/1998 | Katagiri et al. | 340/870.03 |
| 5,874,821 | A | * | 2/1999 | Monleone | 318/600 |
| 7,119,505 | B2 | * | 10/2006 | Komaki et al. | 318/113 |
| 7,508,154 | B1 | * | 3/2009 | Labriola, II | 318/602 |

* cited by examiner

*Primary Examiner*—Walter Benson
*Assistant Examiner*—Eduardo Colon
(74) *Attorney, Agent, or Firm*—Chun-Ming Shih; HDLS IPR Services

(57) ABSTRACT

A motor absolute position signal processing apparatus connected to a signal processor and an optical encoder of a motor control system includes first and second switches, a signal integration amplifier, first and second separators and an inverter. The first switch is connected with the optical encoder, the second switch with the optical encoder and the first switch, the signal integration amplifier with the first and second switches, the first separator with the signal integration amplifier and the signal processor, and the second separator with the signal processor. An input end of the inverter is connected with the second separator and an output end with the second switch. The signal processor outputs an enable signal to be processed by the inverter for switching the first or second switch. The signal integration amplifier processes and transmits two sets of differential signals SIN;/SIN and COS;/COS of the optical encoder to the signal processor.

7 Claims, 4 Drawing Sheets

MOTOR ABSOLUTE POSITION SIGNAL PROCESSING APPARATUS

BACKGROUND OF THE INVENTION

1. Field of the Invention

The present invention generally relates to a position signal processing apparatus, and more particularly to a signal processor of a motor absolute position signal processing apparatus.

2. Description of Prior Art

Servomechanism system refers to a system for controlling the position, speed or acceleration of a mechanical system by a close loop control method. In general, a servo system usually includes several main parts including a plant, an actuator, and a controller, and the plant is a controlled object such as a mechanical arm or a mechanical working platform. The main function of the actuator is to provide power to the plant by pneumatic, hydraulic, or electric driving method. If the hydraulic method is adopted, the actuator is generally called a hydraulic servo system. At present, a vast majority of servo systems adopt the electric driving method, and the actuator includes a motor and a power amplifier, and a special design applied to a motor of the servo system is called a servo motor, which usually includes a position feedback device such as an optical encoder or a resolver. The servo motors mainly used in the industry include DC servo motors, permanent magnet AC servo motors and induction AC servo motors, and the permanent magnet servo motors are used most extensively. The function of the controller is to provide a close circuit control such as torque control, speed control and position control for the whole servo system. In general, the present industrial servo drives usually include a controller and a power amplifier.

The aforementioned servo motors generally include a position feedback device, and the optical encoder provides an incremental signal and an absolute position signal, and the incremental signal and absolute position signal output two sets of differential signals respectively "SIN;/SIN (inverted signal)" and "COS;/COS (inverted signal)". The absolute position signal mainly provides a start position signal of the optical encoder to the motor absolute position signal processing apparatus for the processing, and the processed signal is transmitted to the signal processor for the determination. If the optical encoder starts operating together with the installed electric machine, the signal processor (DSP or MCU) switches processing the incremental signal. Since the absolute position signal just uses the optical encoder for the positioning stage before starting the operation, therefore the motor absolute position signal processing apparatus requires a separator circuit detection with two sets of signal integration amplifiers and two sets of optical couplers (as shown in FIG. 1) to process two sets of differential signals respectively: SIN;/SIN (inverted signal)" and "COS;/COS (inverted signal)" of the absolute position signals. Obviously, the level of complexity of the circuit design becomes higher. In addition, the power supplied to the optical encoder is separated from the signal processor DSP (or MCU). At present, an analog signal device with a transmission separation function usually comes with a large size and a high price, and thus the cost will be very high if the design of two sets of detection circuits is adopted.

SUMMARY OF THE INVENTION

It is a primary objective of the present invention to overcome the foregoing shortcomings by using two analog switches for switching two groups of differential signals, so that the enable signal outputted by the signal processor (DSP or MCU) is controlled to switch reading the two sets of differential signals respectively SIN;/SIN (inverted signal)" and "COS;/COS (inverted signal)" of the absolute position signal.

To achieve the foregoing objective, the present invention provides a signal processor of a motor absolute position signal processing apparatus, comprising: a first switch, a second switch, a signal integration amplifier, a first separator, a second separator and an inverter. The first switch is electrically coupled to the optical encoder for receiving a SIN;/SIN differential signal outputted by the optical encoder. The second switch is electrically coupled to the optical encoder and the first switch for receiving a COS;/COS differential signal outputted by the optical encoder. The signal integration amplifier is electrically coupled to the first and second switches for receiving, integrating and amplifying two differential signals outputted by the first or second switch. The first separator is electrically coupled to the signal integration amplifier and signal processor for isolating any noise interference while signals are being transmitted. The second separator is electrically coupled to the signal processor for isolating any noise interference while signals are being transmitted. The inverter is electrically coupled to the input end, the second separator and the first switch, and the output end is electrically coupled to the second switch for receiving an enable signal outputted by the second separator to switch to the first or second switch.

DETAILED DESCRIPTION OF THE INVENTION

The technical characteristics, features and advantages of the present invention will become apparent in the following detailed description of the preferred embodiments with reference to the accompanying drawings.

Figure 1:
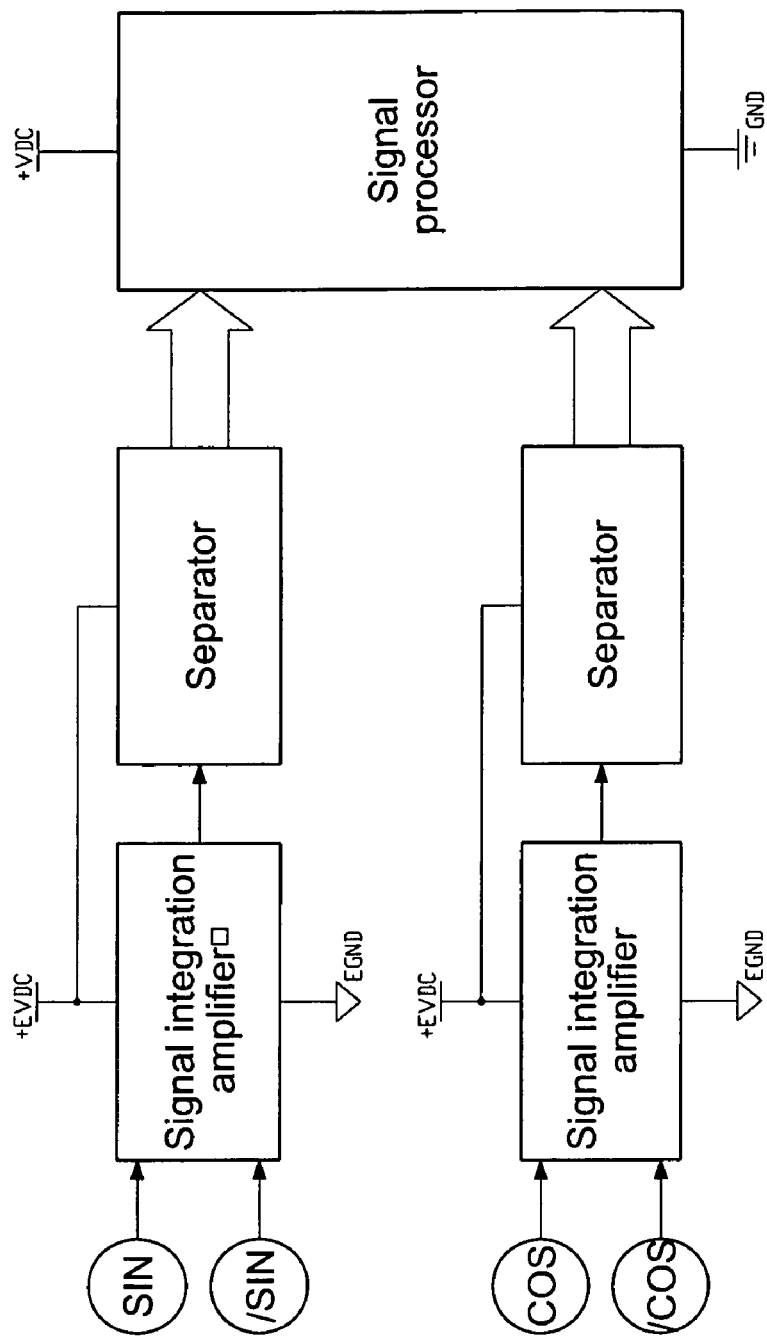
FIG. 1 is a schematic block diagram of connecting a signal processor to a traditional motor absolute position signal processing apparatus.
Figure 2:
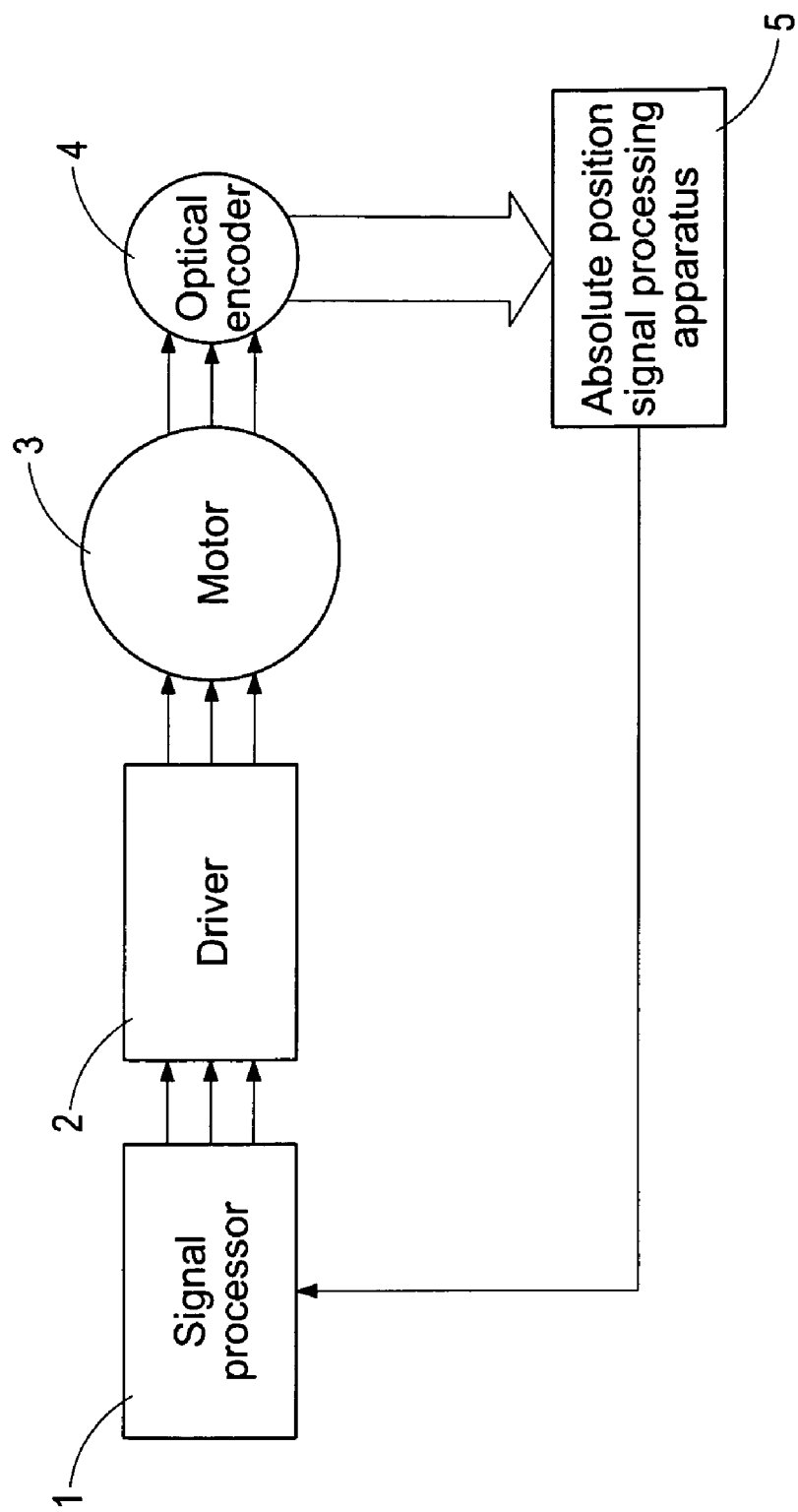
FIG. 2 is a schematic block diagram of a motor control system of the present invention.

Referring to FIG. 2 for a schematic block diagram of a motor control system of the present invention, the motor control system comprises a signal processor (DSP or MCU) 1, a driver (IGBT module) 2, a motor 3, an optical encoder 4 and a motor absolute position signal processing apparatus 5.

When the motor 3 is operated, the optical encoder 4 will provide an incremental signal and an absolute position signal, and both incremental signal and absolute position signal output two sets of differential signals, respectively: "SIN;/SIN (inverted signal)" and "COS;/COS (inverted signal)". The absolute position signal mainly provides a start position signal of the optical encoder 4 to the motor absolute position signal processing apparatus 5. After the signal is processed by the motor absolute position signal processing apparatus 5, the processed signal is transmitted to the signal processor 1 for processing and a control signal is outputted to the driver 2, and the driver 2 outputs a driving signal to drive the operation of the motor 3.

Figure 3:
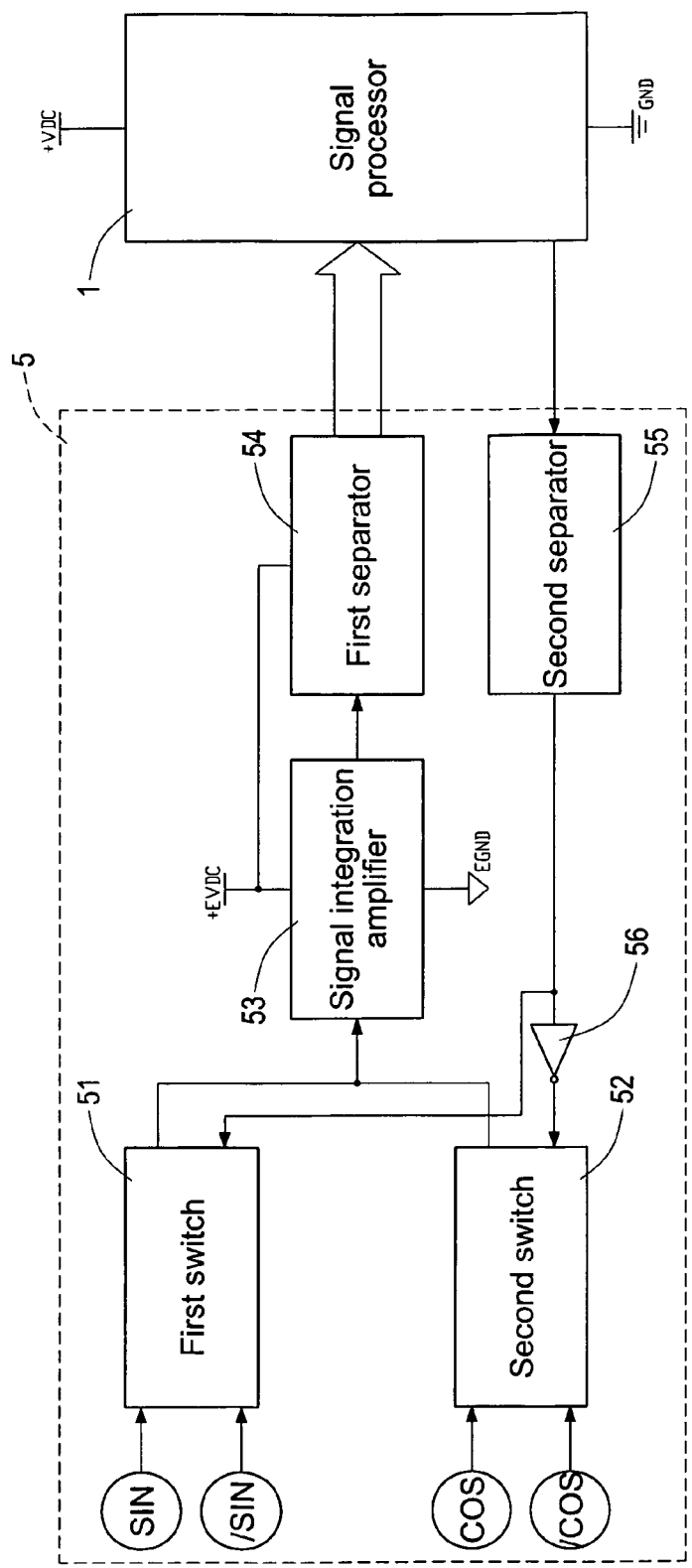
FIG. 3 is a schematic block diagram of connecting a signal processor to a circuit block of a motor absolute position signal processing apparatus in accordance with the present invention.

Referring to FIG. 3 for a schematic block diagram of connecting a signal processor to a circuit block of a motor absolute position signal processing apparatus in accordance with the present invention together with FIG. 2, the motor absolute position signal processing apparatus 5 comprises a first switch 51, a second switch 52, a signal integration amplifier 53, a first separator 54, a second separator 55 and an inverter 56. The first switch 51 is an analog switch electrically coupled to the optical encoder 4 for receiving a differential signal "SIN;/SIN (inverted signal)" outputted by the optical encoder 4.

The second switch 52 is an analog switch electrically coupled to the optical encoder 4 and the first switch 51 for receiving a differential signal "COS;/COS (inverted signal)" outputted by the optical encoder 4.

The signal integration amplifier 53 is an amplifier electrically coupled to the first and second switches 51, 52 for receiving, integrating and amplifying two differential signals outputted by the first switch 51 or second switch 52.

The first separator 54 is an optical coupler electrically coupled to the signal integration amplifier 53 and the signal processor 1 for isolating noise interference while signals are being transmitted.

The second separator 55 is an optical coupler electrically coupled to the signal processor 1 for isolating noise interference while signals are being transmitted.

An input end of the inverter 56 is electrically coupled to the second separator 55 and the first switch 51, and an output end of the inverter 56 us electrically coupled to the second switch 52. The inverter 56 receives an enable signal outputted by the second separator 55 to switch the operation of the first or second switch 51, 52.

Figure 4:
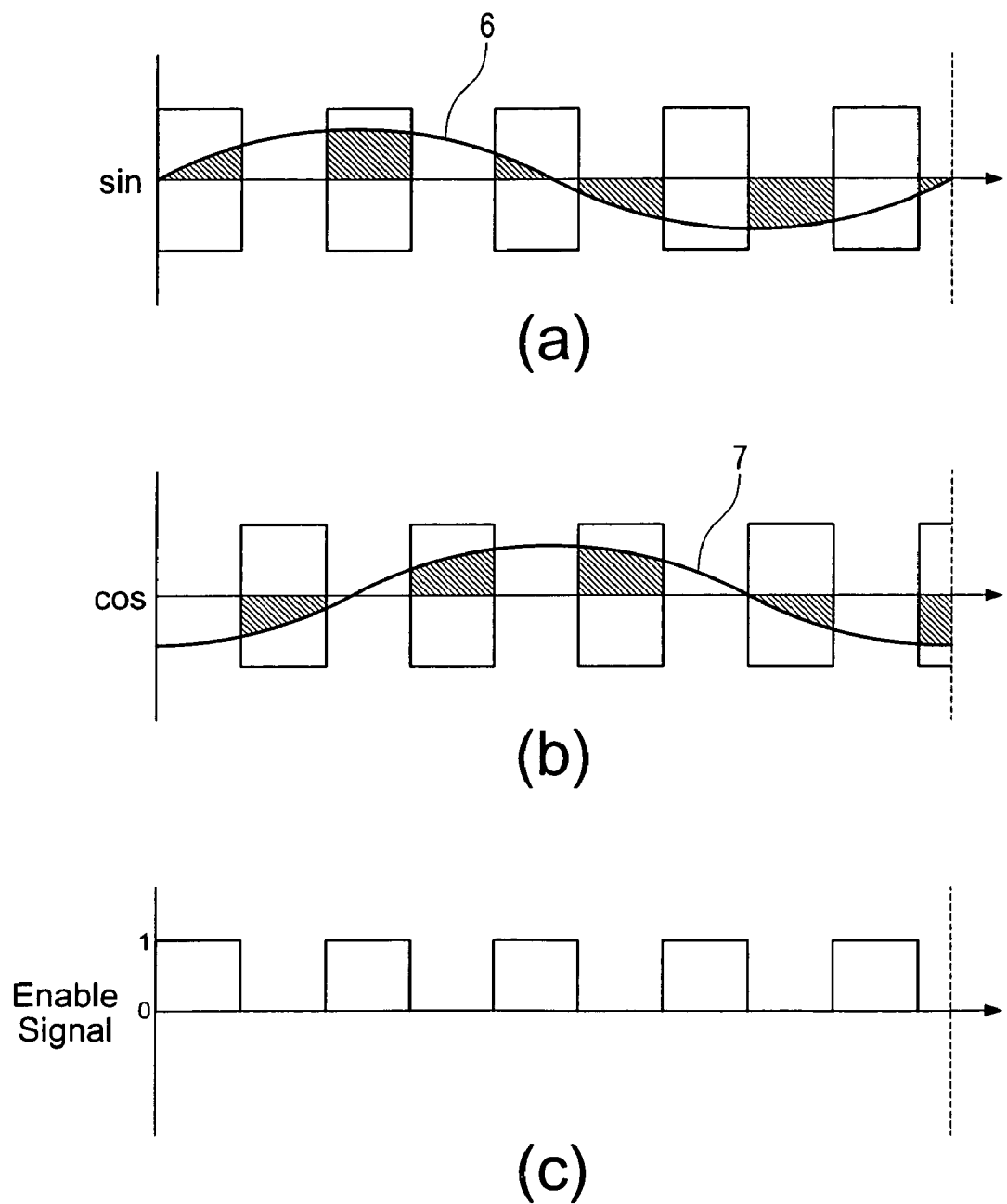
FIG. 4 shows timing charts of a motor absolute position signal and a control signal outputted by a signal processor in accordance with the present invention.

Referring to FIGS. 3 and 4 for a schematic block diagram of connecting a signal processor to a circuit block of a motor absolute position signal processing apparatus in accordance with the present invention and timing charts of a motor absolute position signal and a control signal outputted by a signal processor in accordance with the present invention respectively, it is necessary to know the start position of the motor if a motor control system starts the operation of the motor. When the signal processor 1 outputs an enable signal (as shown in FIG. 4C) from the second separator 55 to the inverter 56, the enable signal is pulled high to an electric potential of "1", and then pulled low and converted to an electric potential of "0" when the enable signal is passed through the inverter 56, so that the first switch 51 is operated, but the second switch 52 is not operated. Now, the first switch 51 outputs two differential signals respectively "SIN;/SIN (inverted signal)". After the differential signals are processed by the signal integration amplifier 53 and the first separator 54, the signal received by the signal processor 1 is the motor absolute position signal 6 as shown in FIG. 4a.

If the enable signal is at a low potential of "0", the enable signal is pulled high to an electric potential of "1" when the signal is passed through the inverter 56. The first switch 51 is not operated, but the second switch 52 is operated. Now, the second switch 52 outputs a differential signal "COS;/COS (inverted signal)". After the differential signal is processed by the signal integration amplifier 53 and the first separator 54, the signal received by the signal processor 1 is a motor absolute position signal 7 as shown in FIG. 4b.

Compared with the prior art, the present invention reduces a circuit of a set of absolute position signals, and thus simplifying the circuit and lowering the cost.

While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A motor absolute position signal processing apparatus, electrically coupled to a signal processor and an optical encoder of a motor control system, for receiving two sets of differential signals, respectively SIN;/SIN and COS;/COS to control an operation of a motor, comprising:
   a first switch, electrically coupled to the optical encoder;
   a second switch, electrically coupled to the optical encoder and the first switch;
   a unique signal integration amplifier, electrically coupled to the first and second switches;
   a first separator, electrically coupled to the signal integration amplifier and the signal processor;
   a second separator, electrically coupled to the signal processor; and
   an inverter, having an unique input end being electrically coupled to the second separator and the first switch and an output end being electrically coupled to the second switch;
   wherein the signal processor outputs an enable signal that is processed by an inverter, for switching operation of the first or second switch, and the unique signal integration amplifier integrates, amplifies and transmits the two sets of differential signals outputted by the optical encoder to the signal processor.

2. The motor absolute position signal processing apparatus of claim 1, wherein the first switch is an analog switch.

3. The motor absolute position signal processing apparatus of claim 1, wherein the second switch is an analog switch.

4. The motor absolute position signal processing apparatus of claim 1, wherein the signal integration amplifier is an amplifier.

5. The motor absolute position signal processing apparatus of claim 1, wherein the first separator is an optical coupler.

6. The motor absolute position signal processing apparatus of claim 1, wherein the second separator is an optical coupler.

7. The motor absolute position signal processing apparatus of claim 1, wherein as the motor control system starts the operation of the motor, a start position of the motor is determined by the enable signal outputted from the signal processor through the second separator to the inverter, if the enable signal is pulled high to an electric potential of "1" and then pulled low and converted to an electric potential of "0" when the enable signal is passed through the inverter, so that the first switch is operated but the second switch is not operated; therefore the first switch outputs two differential signals "SIN;/SIN (inverted signal)", and if the enable signal is at a low potential of "0", the enable signal is pulled high to the electric potential of "1" when the signal is passed through the inverter, so that the first switch is not operated but the second switch is operated; therefore the second switch outputs two differential signals "COS;/COS (inverted signal)".

* * * * *